US009208232B1

(12) United States Patent
Tirumalareddy et al.

(10) Patent No.: US 9,208,232 B1
(45) Date of Patent: Dec. 8, 2015

(54) GENERATING SYNTHETIC DESCRIPTIVE TEXT

(71) Applicant: Google Inc., Mountain View, CA (US)

(72) Inventors: Sundeep Tirumalareddy, Mountain View, CA (US); Michael E. Flaster, Menlo Park, CA (US); Eric Lehman, Mountain View, CA (US); Paul Haahr, San Francisco, CA (US); Yonghui Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/731,891

(22) Filed: Dec. 31, 2012

(51) Int. Cl.
*G06F 17/30* (2006.01)
(52) U.S. Cl.
CPC .................... *G06F 17/30864* (2013.01)
(58) Field of Classification Search
CPC .................... G06F 17/3066; G06F 17/30657
See application file for complete search history.

(56) References Cited

U.S. PATENT DOCUMENTS

| | | | | |
|---|---|---|---|---|
| 6,721,736 | B1 * | 4/2004 | Krug et al. | 707/634 |
| 7,499,913 | B2 | 3/2009 | Kraft et al. | |
| 7,647,306 | B2 | 1/2010 | Rose et al. | |
| 8,145,623 | B1 * | 3/2012 | Mehta et al. | 707/713 |
| 8,346,792 | B1 | 1/2013 | Baker et al. | |
| 8,615,524 | B2 * | 12/2013 | Kanigsberg et al. | 707/765 |
| 2006/0271519 | A1 * | 11/2006 | Blackwood et al. | 707/3 |
| 2008/0215563 | A1 | 9/2008 | Shi et al. | |
| 2009/0171907 | A1 * | 7/2009 | Radovanovic | 707/3 |
| 2009/0172514 | A1 * | 7/2009 | Radovanovic | 715/212 |
| 2009/0228464 | A1 * | 9/2009 | Jones et al. | 707/4 |
| 2009/0259649 | A1 * | 10/2009 | Poola | 707/5 |
| 2010/0174719 | A1 * | 7/2010 | Vilches | 707/741 |
| 2010/0318423 | A1 * | 12/2010 | Kanigsberg et al. | 705/14.53 |
| 2012/0158703 | A1 * | 6/2012 | Li et al. | 707/723 |
| 2012/0278271 | A1 * | 11/2012 | Peoples et al. | 706/52 |
| 2013/0159298 | A1 * | 6/2013 | Mason et al. | 707/728 |

OTHER PUBLICATIONS

Talel Abdessalem, Bogdan Cautis, and Nora Derouiche. 2010. ObjectRunner: lightweight, targeted extraction and querying of structured web data. Proc. VLDB Endow. 3, 1-2 (Sep. 2010).*

* cited by examiner

*Primary Examiner* — Mohammad S Rostami
(74) *Attorney, Agent, or Firm* — Fish & Richardson P.C.

(57) ABSTRACT

Methods, systems, and apparatus, including computer programs encoded on computer storage media, for generating synthetic descriptive text. One of the methods includes identifying a group of linking resources, wherein each of the linking resources includes a link to a respective target resource; determining, from a search engine index, that at least some of the target resources are associated with seed queries; generating term location information that identifies, for each seed query, locations of terms from the seed query in the linking resource that links to the target resource associated with the seed query; generating synthetic descriptive text for the target resources based on the term location information; and associating the synthetic descriptive text with the target resources in the search engine index.

21 Claims, 7 Drawing Sheets

GENERATING SYNTHETIC DESCRIPTIVE TEXT

BACKGROUND

This specification relates to generating synthetic descriptive text for digital resources.

Internet search engines aim to identify resources, e.g., web pages, images, text documents, or multimedia content, that are relevant to a user's needs and to present information about the resources in a manner that is most useful to the user. Internet search engines generally return a set of search results, each of which identifies a resource, in response to a user submitted query.

SUMMARY

This specification describes a system that can generate synthetic descriptive text for target resources that are linked to by a group of linking resources. The system can generate the synthetic descriptive text based on locations in the linking resources of terms from seed queries associated with the target resources. The synthetic descriptive text can be associated with the target resources in a search engine index for use in generating scores for the target resources in response to received search queries. This specification also describes a system that can score resources associated with synthetic descriptive text when the resources are identified as possible search results.

In general, one innovative aspect of the subject matter described in this specification can be embodied in methods that include the actions of identifying a group of linking resources, wherein each of the linking resources includes a link to a respective target resource; determining, from a search engine index, that at least some of the target resources are associated with seed queries; generating term location information that identifies, for each seed query, locations of terms from the seed query in the linking resource that links to the target resource associated with the seed query; generating synthetic descriptive text for the target resources based on the term location information; and associating the synthetic descriptive text with the target resources in the search engine index.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Generating the synthetic descriptive text can include: generating a plurality of candidate templates from the term location information; selecting one or more of the candidate templates as templates; and applying the templates to resources in the group of linking resources to identify synthetic descriptive text for target resources linked to by the other resources.

Generating the plurality of candidate templates can include: determining, from the term location information, that a term from a first seed query associated with a first target resource linked to by a first linking resource appears in a first structure of the first linking resource; and generating a first candidate template that specifies a generative rule for generating synthetic descriptive text for other target resources from structures in other linking resources that are similar to the first structure and that specifies a location in the other linking resources where a link to the other target resources must appear. The first candidate template can include at least one of a literal or a wildcard, the literal including a literal phrase and the wildcard including a type that specifies a category of terms and at least one constraint, wherein each constraint indicates a context within which the terms appear in the first linking resource. The context within which the terms appear in the first linking resource can be based at least in part on a count of a number of times the terms appear in the first linking resource. The first structure can include an embedded coding fragment of the first linking resource. The embedding coding fragment can be a hypertext markup language (HTML) tag pair that encloses the term from the first seed query in the first linking resource.

The method can further include selecting the first candidate template as a first template and applying the first template to other linking resources can include: identifying other embedded coding fragments of the other linking resources that match the embedded coding fragment identified in the first candidate template; and designating content in the other embedded coding fragments as synthetic descriptive text in accordance with the generative rule.

Particular embodiments of the subject matter described in this specification can be implemented so as to realize one or more of the following advantages. Text that describes a resource can be generated from text in another resource that links to the resource. In particular, high quality descriptive text can be generated even if the anchor text in links to the resource tends to be of low quality. Search results identifying resources that are relevant to a user's query but that tend to be linked to by links having low quality anchor text can be promoted in a presentation order of search results returned in response to the query. Thus, the user experience may be improved because search results higher in the presentation order may better match the user's informational needs. Additionally, the user experience may be improved because resources that are relevant to a user's query but do not include any occurrences of any of the terms of the user's query may be identified by search results returned in response to the query.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
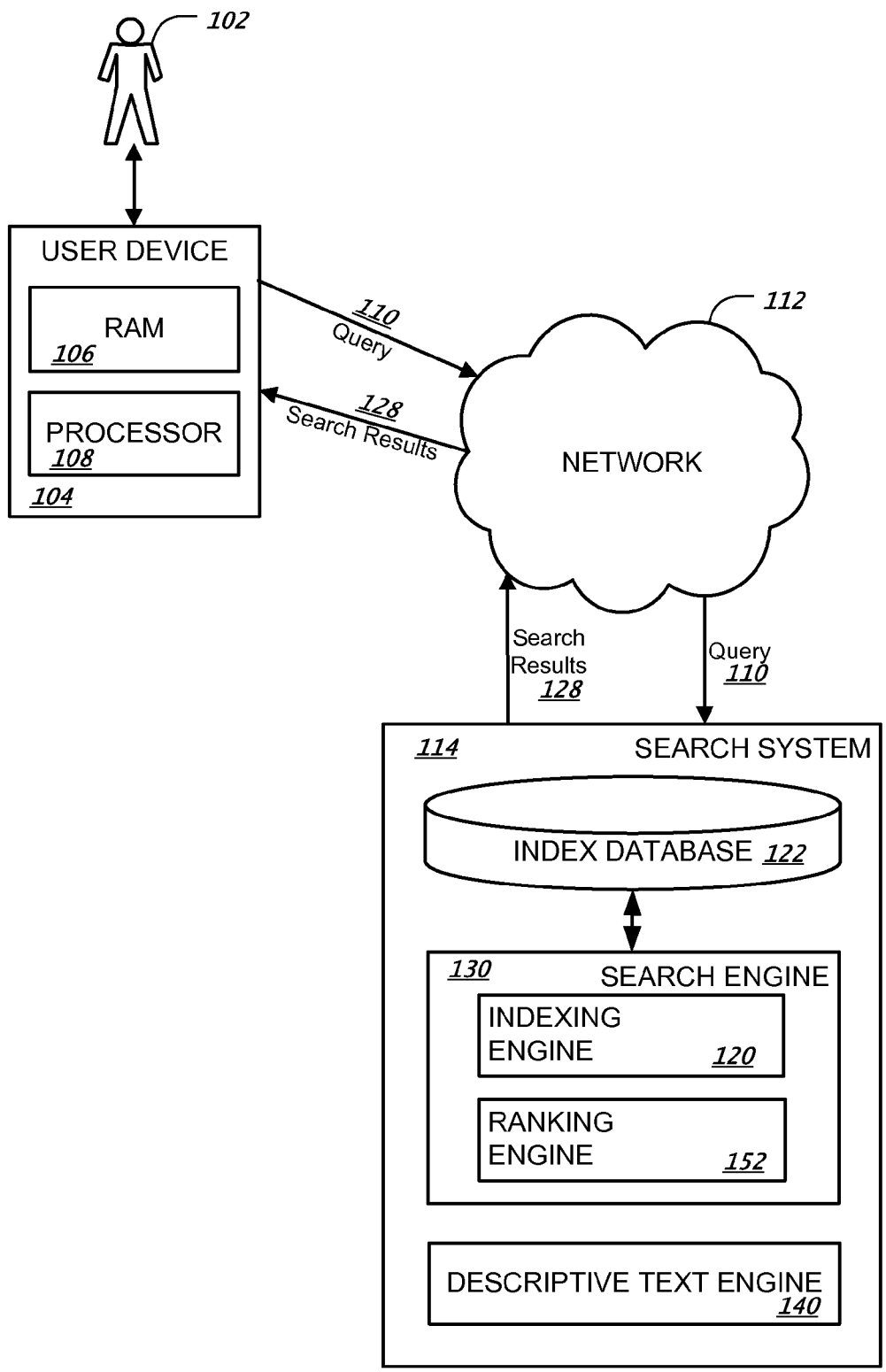
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. The user device 104 will generally include a memory, e.g., a random access memory (RAM) 106, for storing instructions and data and a processor 108 for executing stored instructions. The memory can include both read only and writable memory. For example, the user device 104 can be a computer coupled to the search system 114 through a data communication network 112, e.g., local area network (LAN) or wide area network (WAN), e.g., the Internet, or a combination of networks, any of which may include wireless links.

In some implementations, the search system 114 provides a user interface to the user device 104 through which the user 102 can interact with the search system 114. For example, the search system 114 can provide a user interface in the form of web pages that are rendered by a web browser running on the user device 104.

A user 102 can use the user device 104 to submit a query 110 to a search system 114. A search engine 130 within the search system 114 performs a search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on multiple storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

The search system 114 also includes or can communicate with a synthetic descriptive text engine 140 that generates synthetic descriptive text for resources and associates the synthetic descriptive text with the resources in an index, e.g., an index in the index database 122. Generating synthetic descriptive text for resources will be described below with reference to FIGS. 2 and 3. The search system 114 can use the synthetic descriptive text generated by the synthetic descriptive text engine 140 to adjust initial scores generated by the search engine 130 for resources that match the query 110. Adjusting an initial score for a resource is described below with reference to FIG. 4.

Figure 2:
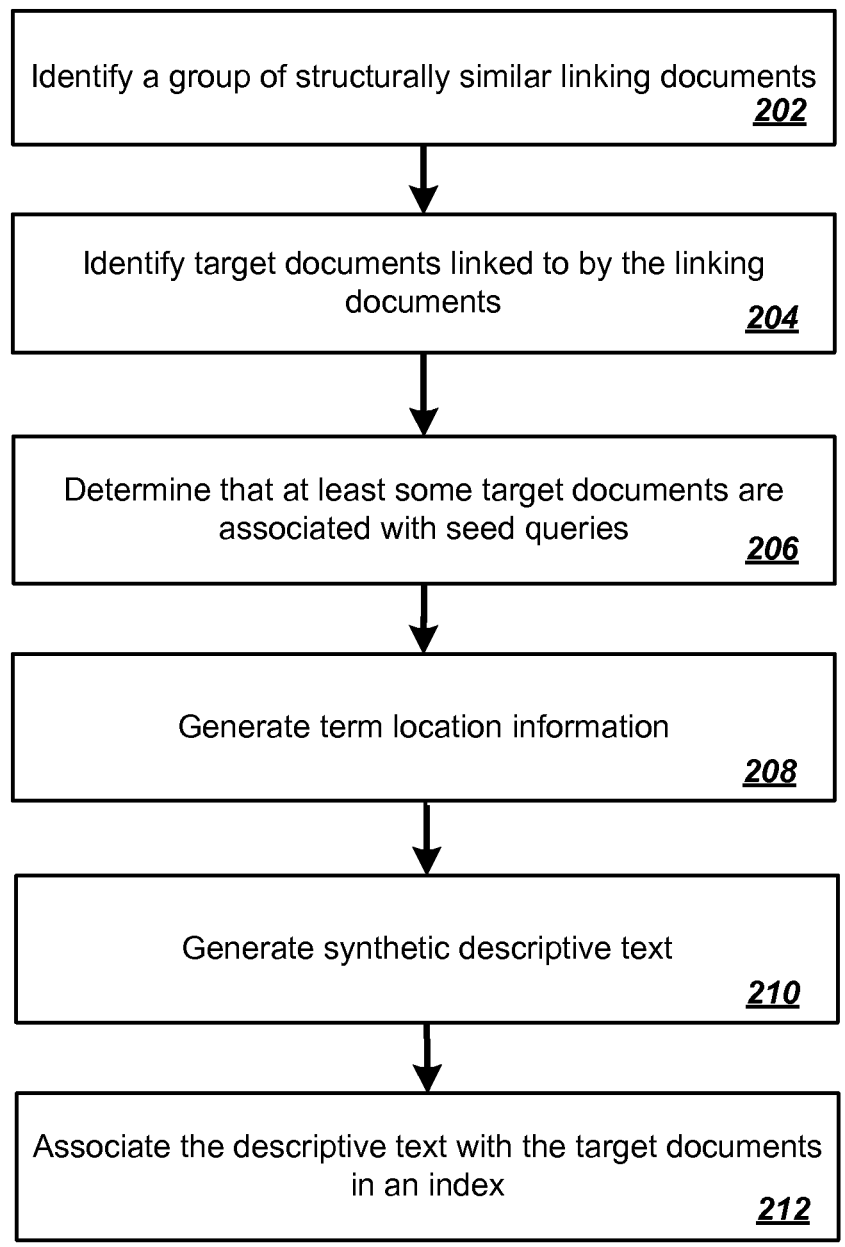
FIG. 2 is a flow diagram of an example process for associating synthetic descriptive text with resources as metadata in a search engine index.

FIG. 2 is a flow diagram of an example process 200 for associating synthetic descriptive text with resources in a search engine index. For convenience, the process 200 will be described as being performed by a system of one or more computers located in one or more locations. For example, a search system, e.g., the search system 114 of FIG. 1, appropriately programmed in accordance with this specification, can perform the process 200.

The system identifies a group of linking resources (step 202). The resources in the group are resources that share certain common traits. For example, the resource in the group can be resources that can be addressed using a common domain name or Internet Protocol (IP) address, e.g., that are hosted on a same website. For example, the group of linking resources may be a website that links to a sufficient number of resources that are associated with seed queries in a search engine index, that links to a sufficient number of resources hosted on a different website, or that links to resources hosted on a sufficient number of different websites. The resources in the group can include static resources, e.g., resources in HyperText Markup Language (HTML) or Extensible Markup Language (XML) format; dynamic resources, e.g., resources dynamically generated using Java Sever Pages (JSP) or PHP: Hypertext Preprocessor (PHP) technologies; or both. Additionally, the system may determine whether resources in the group include data indicating that search engines not use the links in the resource to adjust the ranking of the resources linked to by the resource, e.g., whether a specified value has been assigned to a particular attribute of an HTML element in the resource. The system may then remove resources that include this data from the group of resources.

The system identifies target resources linked to by the linking resources (step 204). The target resources are resources that are linked to by links within the linking resources. Optionally, the system identifies only resources outside of the group of resources as target resources, i.e., so that a link from one resource in the group of resources to another resource in the group of resources does not result in a target resource being identified.

The system determines that at least some of the target resources are associated with seed queries in a search engine index, e.g., an index in the index database 122 of FIG. 1 (step 206). The seed queries are identified and associated with resources in the search engine index based on selections made by users of search results provided to users by the search engine. For example, the seed queries for a particular resource can be search queries in response to which users have frequently selected search results that identify the particular resource. A selection of a search result can be, e.g., a user action made with respect to the search result that initiates a request for the resource identified by the search result. For example, the user action with respect to the search result may be a "click" on the search result, a voice-based selection, or a selection by a user's finger on a presence-sensitive input mechanism, e.g., a touch-screen device, or any other appropriate selection mechanism. In some implementations, selection data may not be tethered to the identity of individual users. The system generates term location information that identifies locations of terms from seed queries in linking resources (step 208) and generates synthetic descriptive text for target resources based on the term location information (step 210). The locations are defined in terms of formatting elements in the programming language structure of the linking resource in which the terms from the seed queries appear. For example, the system can generate templates based on the term location information and apply the templates to other linking resources to generate synthetic descriptive text for target resources linked to by the other linking resources. Generating term location information and generating synthetic descriptive text using term location information is described below with reference to FIGS. 3-5.

The system associates the synthetic descriptive text with the target resources in the search engine index (step 212). Synthetic descriptive text associated with a target resource can then be used by a scoring process that scores the resource in response to a received search query.

Figure 3:
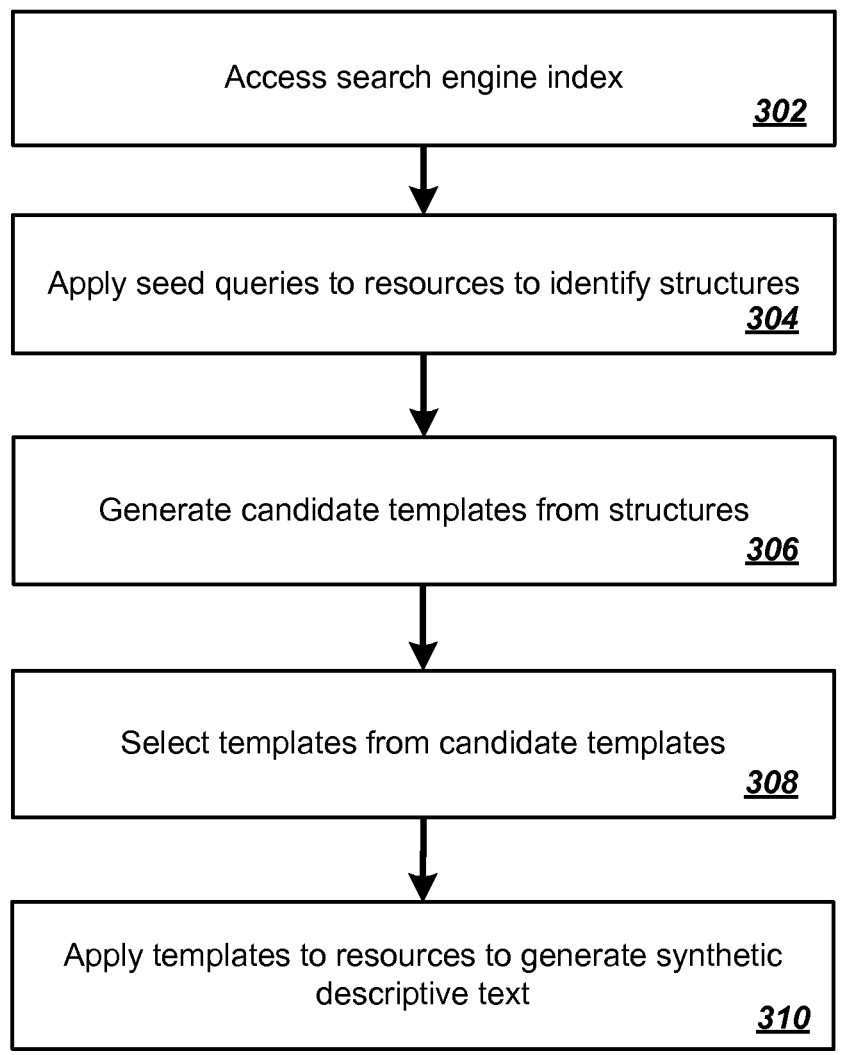
FIG. 3 is a flow diagram of an example process for generating synthetic descriptive text for target resources.

FIG. 3 is a flow diagram of an example process 300 for generating synthetic descriptive text for target resources. For convenience, the process 300 will be described as being performed by a system of one or more computers located in one or more locations. For example, a search system, e.g., the search system 114 of FIG. 1, appropriately programmed in accordance with this specification, can perform the process 300.

The system accesses a search engine index to acquire a set of seed queries that are associated with target resources linked to by a group of linking resources (step 302).

The system applies the seed queries to the resources that link to the target resources to identify structures in the linking resources in which the query terms of seed queries appear (step 304) and locations in the linking resources where the links to the target resources appear. A "structure" of a resource is a particular formatting element in the programming language structure of the resource and, optionally, content associated with the element. For example, a structure in an HTML resource can be a pair of HTML tags as well as some or all of the text fragments between the pair of HTML tags or one or more attributes of the pair of tags or both. A structure can have various forms, including hierarchical forms in which tags are nested in other tags. The locations of the links in the resource can be expressed in terms of, e.g., the location in the programming language structure of the resource where the link appears.

For example, a particular seed query associated with a resource linked to by a particular HTML resource may be "Dorothy Parker" and the HTML resource may contain an embedded coding fragment "<h1>Dorothy Parker—Biography</h1>." The tag pair <h1> and </h1>, which defines a large heading size in HTML, as well as text fragments "—Biography" included in the tag pair, can be extracted from the embedded coding fragment and used for generating synthetic descriptive text.

By applying query terms of seed queries to linking resources, the system can generate a set of structures, e.g., "<h1>[ . . . ]—Biography</h1>", where the terms in the brackets relate to the seed queries. These structures are referred to as embedded coding fragments, as the structures can include coding fragments, e.g., HTML tags, that are embedded in the linking resources that link to the target resources that are associated with seed queries.

The system generates a set of candidate templates from the structures (step 306). Each candidate template includes one or more structures identified based on occurrences in a linking resource of terms from a seed query associated with a target resource and specifies a location in the linking resource where a link to the target resource appears. The candidate templates can be used to produce synthetic descriptive text for target resources from linking resources that link to the target resources.

In some implementations, the candidate templates include generative rules that can be used to extract words, phrases, or text segments from embedded coding fragments that match one or more formats defined by the generative rules in the candidate templates. Applying the candidate templates and the generative rules to resources extracts embedded coding fragments that are structurally similar to the embedded coding fragments found in the linking resources used to generate the candidate templates. For example, a candidate template may identify an HTML structure "<h1>[ . . . ]—Biography</h1>" as a coding fragment to be used to identify other terms in a resource. The generative rule specifies that any text within the brackets is extracted as synthetic descriptive text. One of the linking resources in the subset may contain a structure "<h1>Sylvia Plath—Biography</h1>," which is structurally similar to "<h1>Dorothy Parker—Biography</h1>" in that both of the structures have the same form "<h1>[ . . . ]—Biography </h1>." The system can generate "sylvia plath" as synthetic descriptive text for the target resource linked to by the linking resource in the subset. Depending on the implementation, the synthetic descriptive text can be case insensitive or case sensitive.

In various implementations, identifying embedded coding fragments includes identifying embedded coding fragments using literals, identifying embedded coding fragments using wildcards from query resource pairs, or both. Examples that include further details on some of these identifying processes are described below with reference to FIGS. 4 and 5.

The system selects templates for use in generating synthetic descriptive text from the candidate templates (step 308). The system can select templates from the candidate templates using any of a variety of criteria. For example, the system can select a candidate template as a template only if the same candidate template was generated from more than a threshold number of distinct seed query-resource pairs. As another example, the system can select a candidate template as a template only if the same candidate template was generated from more than a threshold number of distinct linking resources in the group of resources. As another example, the system can select a candidate template as a template only if the same candidate template was generated using seed queries associated with more than a threshold number of distinct target resources.

In some implementations, in selecting templates from candidate templates, the system can merge two or more candidate templates, e.g., by revising constraints in the candidate templates. That is, the system can merge two candidate templates that are the same except for a minimum count value specified by the candidate templates for a particular constraint. For example, the system can merge two candidate templates that are the same except that one includes a constraint "<generic type:h1> <location:count>=7>" and the other includes a constraint "<generic type:h1> <location:count>=5>" into a single candidate template that includes the a constraint "<generic type:h1> <location:count>=5>."

The system applies the templates to the linking resources to generate synthetic descriptive text for target resources linked to by the linking resource in the subset (step 310). When applying the templates to the linking resource, the system uses the templates to extract words, phrases, or text segments that match the structures as defined in the templates from resources that have a link to a linking resource in the location specified in the templates. If no words, phrases, or text segments from a linking resource match the constraints specified by any of the templates, no synthetic descriptive text is generated for the target resources linked to by the linking resource.

Figure 4:
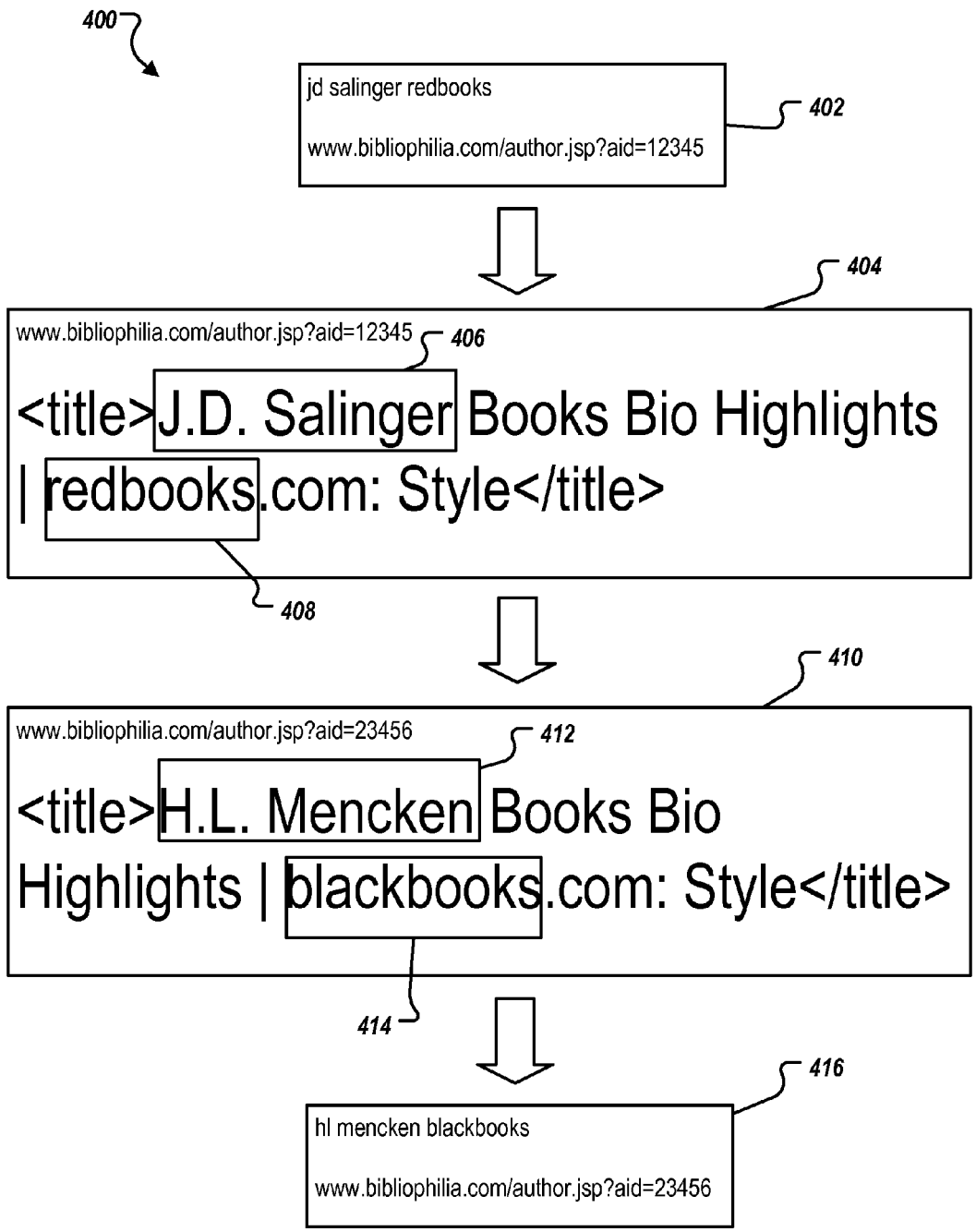
FIG. 4 is a block diagram of example implementations of query generation techniques using structural similarity based on literals.

FIG. 4 is a block diagram 400 of example implementations of synthetic descriptive text generation techniques using structural similarity based on literals. Literals are strings of words, phrases, or text segments without any wildcard characters.

Box 402 includes an example query-resource pair. The seed query in the query-resource pair is associated with a particular target resource and includes query terms "jd salinger redbooks," which, depending on configuration or implementation, can be case sensitive or case insensitive. Likewise, in some implementations, the query term can be normalized by removing punctuation marks such that, for example, the query term "jd" can match "J.D." The resource in the query-resource pair is a linking resource that links to the target resource. In the illustrated example, the resource is the resource addressed by the uniform resource locator (URL) "www.bibliophilia.com/authorjsp?aid=12345".

The URL in the query-resource pair of box 402 can link to static resource content, e.g., a static HTML resource, or dynamic resource content, e.g., an HTML page generated on a server associated with domain name "bibliophilia.com" using JSP. Both static and dynamic content can include dynamic elements, e.g., JavaScript scripts that, when executed, perform certain tasks, including, for example, generating customized information on a display or making the displayed content responsive to user actions. Both the static and dynamic content can be structured content that includes embedded coding.

Box 404 illustrates an embedded coding fragment identified from the resource using any of a variety of rules for extracting fragments of structures, e.g., embedded coding fragments, from the resource. For example, a rule can specify that the system identify an embedded coding segment, e.g., a pair of HTML tags and the content enclosed by the tags, if the embedded coding fragment includes the terms of the query, e.g., if the embedded coding fragment includes both "jd salinger" and "redbooks."

In the example given in box 404, the following tagged text is identified from the resource:
<title>J. D. Salinger Books Bio Highlights|redbooks.com: Style</title>

In this embedded coding fragment, segment 406 "J. D. Salinger" and segment 408 "redbooks" match the query terms. The rule can specify that the tags enclosing the segments 406 and 408, and all the enclosed text, be extracted as an embedded coding fragment.

Based on the embedded coding fragment, the system creates a template. For example, a template "template 1" can specify text in the position of the segments 406 and 408 to be extracted from similar embedded coding fragments in other resources. The template also specifies a location where a link to a target resource must appear in the other resources.

TABLE 1 an example template generative rule pseudo-code

Template 1 Generative Rule
Segment 1: the tag hierarchically, under the <title> tag, from the beginning of the tag until a fixed marker (e.g., a text segment that starts from immediately after the tag "<title>" to immediately before the static text "Books Bio Highlights | "

TABLE 1-continued an example template generative rule pseudo-code

Segment 2: the text hierarchically under the <title> tag, in between "Books Bio Highlights | " and ".com: Style</title>"

Box 410 illustrates an application of the template to another linking resource that has a link to a target resource in the location specified by the template. The template is used to identify embedded coding in the other linking resource that is structurally similar to the embedded coding described in the template. In some implementations, two pieces of embedded coding can be determined to be structurally similar when the two pieces of embedded coding are the same except for the portions of the pieces of embedded coding specified by the templates being a potential term for a piece of synthetic descriptive text. For example, in the example given in box 410, the following tagged text is identified from the resource addressed by the URL "www.bibliophilia.com/author.jsp?aid=23456":
<title>H. L. Mencken Books Bio Highlights|blackbooks.com: Style</title>

In this embedded coding, segment 412 "H. L. Mencken" and segment 414 "blackbooks" are in an embedded coding structure that is similar to the structure in which segment 406 "J. D. Salinger" and segment 408 "redbooks" are located. The segments 412 and 414 are thus used to generate synthetic descriptive text 416 "h1 mencken blackbook." The synthetic descriptive text can be associated with a target resource linked to by the other linking resource, i.e., the resource that is addressed by the URL "www.bibliophilia.com/author.jsp?aid=23456".

Figure 5:
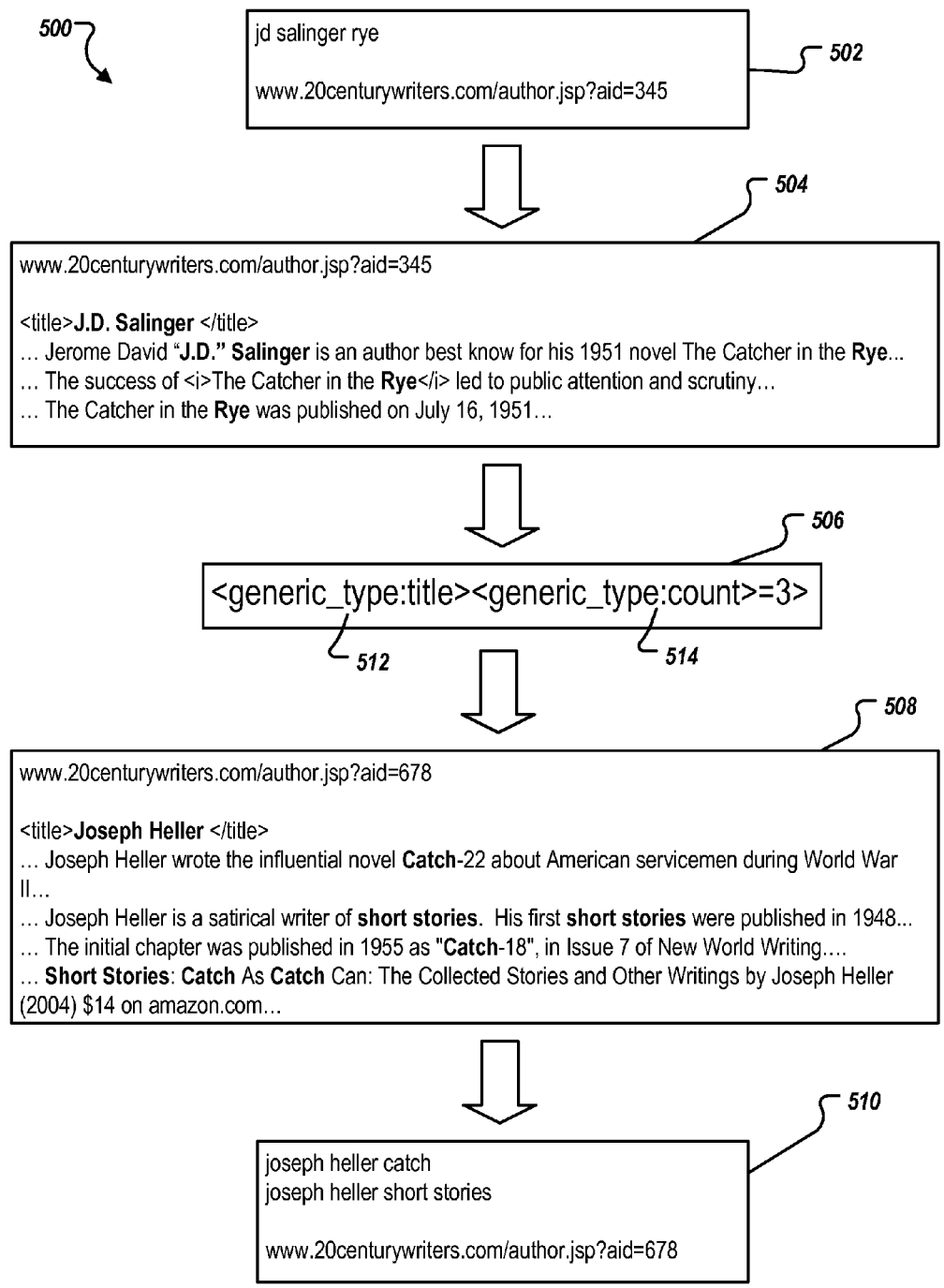
FIG. 5 is a block diagram of example implementations of query generation techniques using structural similarity based on wildcards.

FIG. 5 is a block diagram 500 of example implementations of synthetic descriptive text generation techniques using structural similarity based on wildcards. In addition to literals, wildcards can be used in generating synthetic descriptive text. A wildcard can include specific descriptions of where a text segment is located (e.g., in a <title> tag or an <h1> tag), and characteristics specifying how frequently the text segments appear in a resource, e.g., a particular segment that has appeared in a resource at least three times.

Box 502 includes an example seed query-resource pair. The seed query includes query terms "jd salinger rye" and is associated with a resource linked to by the resource that is addressed by URL "www.20centurywriters.com/authorjsp?aid=345". Box 504 illustrates matches between the seed query and the resource that satisfy certain identification rules. Terms in the resource matching terms from the seed query are represented in bold in box 504. A term in the resource may be considered to match a term from the seed query if the term appears in both the seed query and the linking resource.

Once terms in the linking resource that match terms from the seed query are identified, the system identifies embedding coding fragments that satisfy one or more template extraction rules. In various implementations, template extraction rules are specified to capture various patterns on how text appears in a resource. Each query-resource pair can be associated with numerous template extraction rules. Based on these template extraction rules, the system can generate templates for generating synthetic descriptive text. For example, a template extraction rule can specify that a template shall be generated if at least a part of the title of the resource matches some query terms, and if some query terms appear at least a threshold number of times in the resource.

Box 506 illustrates an example template generated from the seed query "jd salinger rye." The example template includes two sections: <generic type:title> and <generic type:count=3>, each section defining a structure. The <generic type:title> section indicates that a match between the resource and the seed query must exist in the <title> tag of an HTML resource. The term "generic type" specifies that a type of the component that exists in the <title> tag is a generic type. The example template can also specify a location in the linking resource where the link to the target resource appears.

A wildcard has the form of <type> or <type:constraint>. The "type" portion indicates a category of terms that can satisfy the template. The "generic type" type indicates a most general type that can be satisfied by any unigram or n-gram. In some implementations, in order to satisfy the "generic type" type, the unigram or n-gram must be included in a dictionary, phrase table, or other data source that identifies known unigrams and n-grams. Other types are possible. For example, the type can be a date, number, or URL type. "Generic type" can be the default type when information on other types is unavailable.

The "constraint" portion can indicate a resource-based context in which the specified type of text must appear for there to be a match with the template. The constraint can include a name of an HTML tag (e.g., <h1> or <title>), which indicates that the type of text needs to appear in a section of the resource that is enclosed by the named HTML tag pair. If a wildcard does not have a "constraint" portion (e.g., the wildcard is "<generic type>"), the wildcard can match any term that appears anywhere in the resource. If the wildcard has a constraint portion that specifies "count>n," the terms are required to appear in the resource more than n times. Therefore, for example, the second portion of the template as shown in box 506 "<generic type:count>=3>" can refer to any term that has a "generic-type" (e.g., "rye") that appears in the resource at least three times and that matches some portion of the seed query.

The example template shown in box 506 contains two sections 512 and 514. Each section contains a wildcard. A template can include an unlimited number of sections. Each section can be used to generate one or more text segments. The text segments generated by each segment can be concatenated or otherwise joined together to produce a piece of synthetic descriptive text.

In some implementations, the template can be associated with additional constraints based on characteristics of a wildcard. For example, if, as synthetic descriptive text is being generated, a wildcard sufficiently frequently refers to rare terms, e.g., terms having an inverse document frequency (IDF) that is at or above a first threshold value, the system can add an additional constraint that specifies that the wildcard not be associated with a common term, e.g., a term having an IDF that is at or below a second threshold value.

The system generates synthetic descriptive text by applying the template, e.g., the template shown in box 506, to other resources, e.g., other resources in the group of linking resource. In box 508, the system has identified portions of a resource identified by the URL "www.20centurywriters.com/author.jsp?aid=678" that match the template. In this example, a first text segment "Joseph Heller" matches the first section of the template, when the text segment "Joseph Heller" appears in a pair of <title> and </title> tags. Second text segments "short," "stories," "short stories," and "catch" each match the second section of the template, because segments "short," "stories," and "short stories" has each appeared three times in the resource. Concatenating the first text segment separately with each one of the second text segments, the system can generate four pieces of synthetic descriptive text

510: "joseph heller catch," "joseph heller short," "joseph heller stories," and "joseph heller short stories."

In some implementations, the system combines the literals and wildcards described in reference to FIGS. 4 and 5 to produce templates. An example template that includes both literals and wildcards will be described with reference to Tables 2 and 3. Table 2 includes example existing seed queries associated with a target resource linked to by a particular linking resource (e.g., an example webpage "http://www.winebow.com/wine_producer.asp?producer=643"):

TABLE 2

| Example Seed Queries |
| --- |
| valle reale |
| valle real montepulciano |
| montepulciano varietal |
| valle reale abruzzo |
| valle reale wines |
| valle reale winery |
| valle reale winebow |

Table 3 shows an example set of templates. The templates each can contain one or more sections, and each section can be a literal or a wildcard.

TABLE 3

Example Templates

| Template | Wildcard Portion(s) | Literal Portion |
| --- | --- | --- |
| <generic type:h1> | <generic type:h1> | — |
| <generic type:h1> "montepulciano" | <generic type:h1> | "montepulciano" |
| <generic type:h1> <location:count>=7> | <generic type:h1> <location:count>=7> | — |
| <generic type:count>=7> "winery" | <generic type:count>=7> | "winery" |

Once the system generates synthetic descriptive text for a particular target resource, the system associates the synthetic descriptive text with the target resource in a search engine index. The synthetic descriptive text can then be used as an input in determining a score for the resource in response to received search queries, e.g., to adjust initial scores generated by a search engine for the target resource in response to a received search query.

Figure 6:
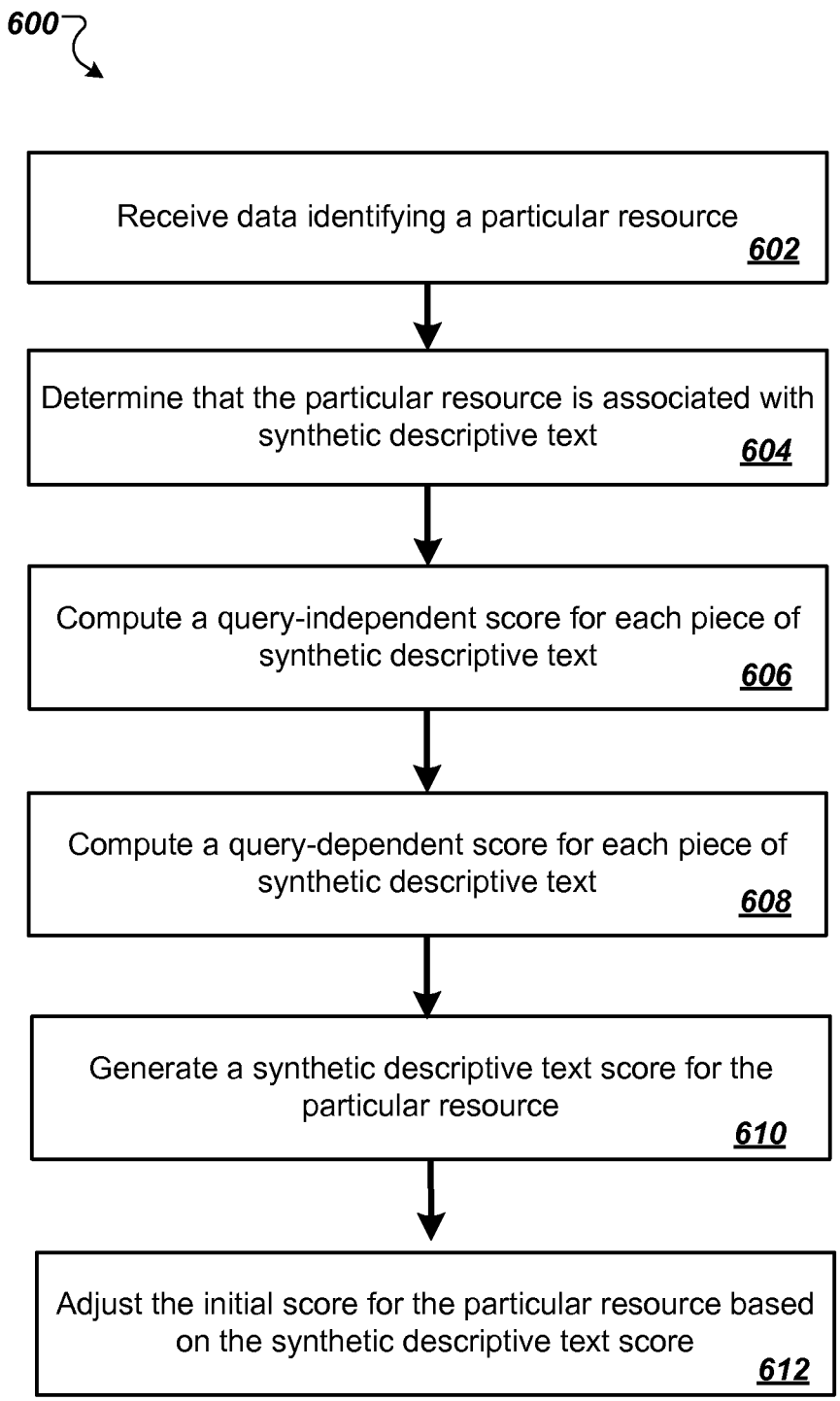
FIG. 6 is a flow diagram of an example process for adjusting an initial score for a resource identified by search results for a received search query.

FIG. 6 is a flow diagram of an example process 600 for adjusting an initial score for a resource identified by search results for a received search query. For convenience, the process 600 will be described as being performed by a system of one or more computers located in one or more locations. For example, a search system, e.g., the search system 114 of FIG. 1, appropriately programmed in accordance with this specification, can perform the process 600.

The process 600 may be performed for multiple resources identified by search results generated in response to a received search query.

The system receives data identifying a particular resource, e.g., a resource identifier of some kind, and an initial score for the resource (step 602). The initial score is generated for the particular resource in response to the received search query. The score may be, e.g., a score that measures the quality of the particular resource, the relevance of the particular resource to the search query, or both.

The system determines that the particular resource is associated with one or more pieces of synthetic descriptive text in a search engine index (step 604). Each piece of synthetic descriptive text associated with the particular resource has been generated by applying a respective template to a respective linking resource, i.e., a resource that links to the particular resource.

The system computes a query-independent score for each piece of synthetic descriptive text (step 606). The system can compute the query-independent score at any of a variety of times. In some implementations, the system computes the query-independent score when the piece of synthetic descriptive text is associated with the resource in the search engine index and associates the score with the piece of synthetic descriptive text in the index. In some other implementations, the system computes the query-independent score independently from the indexing process but before search time. In yet other implementations, the search system computes the query-independent score at search time. Example processes for computing a query-independent score for a piece of synthetic descriptive text are described below with reference to FIG. 7.

The system computes a query-dependent score for each piece of synthetic descriptive text (step 608). The query-dependent score is generated based on the degree to which—i.e., how well—the piece of descriptive text matches the received search query. In some implementations, the query-dependent score is computed so that the query-dependent score for a piece of synthetic descriptive text that exactly matches the text of the received search query is much greater than that the query-dependent score for any pieces of synthetic descriptive text that are only a partial match to the text of the received search query.

For example, the score may be computed by dividing the count of terms that are in both the received search query and the piece of synthetic descriptive text by the count of terms that are in either the received search query or the piece of synthetic descriptive text. That is, for a piece of descriptive text consisting of terms A, B, and C and a received search query consisting of terms A, B, and D, the score similarity score can be computed by dividing the number of terms in the intersection of the terms in the query and the piece of text, i.e., A and B, by the number of terms in the union of the terms in the query and the piece of text, i.e., A, B, C, and D. The system can optionally assign more or less weight to terms from the query in the calculation relative to terms from the piece of descriptive text, e.g., so that a term in the union of the terms received query and the piece of text that is in the query can be given twice as much weight as a term that is only in the piece of text.

In some implementations, the system adjusts the query-dependent scores for the pieces of descriptive text based on the number or proportion of pieces of descriptive text that are extraneous to the received query, i.e., that have query-dependent scores below a pre-determined threshold. That is, the system can reduce the query-dependent scores for each of the pieces of synthetic descriptive text associated with the resource based on the number or proportion of pieces of synthetic descriptive text that are extraneous to the received query. For example, the adjustments may be computed such that if a first target resource has three associated pieces of synthetic text of one word each, A, B, and C, and a second target resource has two associated pieces of synthetic text, A and B, for a received search query "A," the query-dependent scores for the pieces of synthetic text associated with the second target resource will be higher than the query-dependent scores for the pieces of synthetic text associated with the first target resource due to an additional extraneous piece of synthetic text, i.e., C, being associated with the first target resource.

The system combines the query-dependent and query-independent scores to generate a synthetic descriptive text score for the particular resource (step 610). The system combines the query-dependent score and the query-independent score for each piece of descriptive text, e.g., by computing the product or sum or a weighted average of the two scores. The system then aggregates the combined scores to generate the synthetic descriptive text score, e.g., by computing the sum or a weighted average of the combined scores.

Optionally, if the synthetic descriptive text score exceeds a maximum score, the system can set the synthetic descriptive text score equal to the maximum score. In some implementations, the value of the maximum score is based on the value of the initial score for the resource. In some other implementations, the value of the maximum score is based on other data available to the system that indicates the relevance of particular terms to the resource. For example, if the data indicates that terms from pieces of synthetic descriptive text associated with the resource are relevant, the maximum score can be higher than if the data indicates that terms from pieces of synthetic descriptive text are not relevant.

The system adjusts the initial score for the resource based on the synthetic descriptive text score (step 612). For example, the system may use the synthetic descriptive text score in a similar manner as scores generated for other pieces of descriptive text about the resource, e.g., anchor text. The system can adjust the initial score by, e.g., adding the synthetic descriptive text score to the initial score or by taking the product of the initial score and the synthetic descriptive text score.

Figure 7:
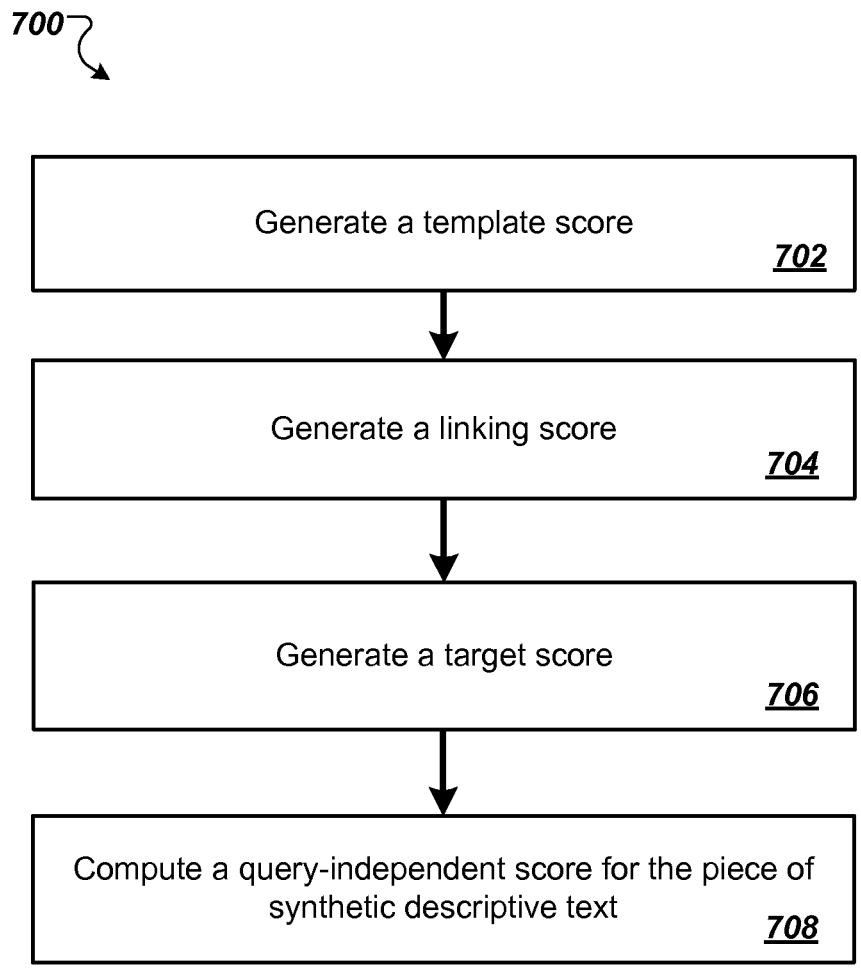
FIG. 7 is a flow diagram of an example process for generating a query-independent score for a piece of synthetic descriptive text.

FIG. 7 is a flow diagram of an example process 700 for generating a query-independent score for a piece of synthetic descriptive text. For convenience, the process 700 will be described as being performed by a system of one or more computers located in one or more locations. For example, a search system, e.g., the search system 114 of FIG. 1, appropriately programmed in accordance with this specification, can perform the process 700.

The system generates a template score for the template used to generate the piece of synthetic descriptive text (step 702). The system can generate the template score based on any of a variety of characteristics of the template.

For example, the template score can be based at least in part on a number of distinct embedding coding fragments that were used to generate the template. That is, the system can generate the template score so that a template that was generated from a larger number of distinct embedding coding fragments in linking resources is assigned a larger template score than an otherwise equivalent template that was generated from a relatively smaller number of distinct embedding coding fragments.

As another example, the template score can be based in part on the number of different target resources for which the template generates descriptive text. That is, the system can compute the template scores so that a template that has been used to generate descriptive text for a larger number of distinct target resources is assigned a smaller template score than an otherwise equivalent template that has been used to generate descriptive text for a relatively smaller number of distinct target resources. Optionally, the system can also consider whether the template generates different descriptive text when applied to different target resources, e.g., so that templates that generate the same descriptive text when applied to different target resources have their template scores decreased.

As another example, the template score can be based in part on how many different pieces of synthetic descriptive text the template generated for the target resource from the same linking resource from which the piece of descriptive text being scored was obtained, e.g., so that templates that generate large numbers of pieces of descriptive text from the same linking resources have their template scores decreased.

As another example, the template score can be based in part on respective resource quality measures of the target resources for which the template generates synthetic descriptive text. That is, the system can access data that specifies resource quality measures for resources, and aggregate the measures to generate a score for the template, e.g., so that templates that tend to generate descriptive text for higher quality resources have larger scores than templates that tend to generate scores for lower quality resources.

The system can compute the template score from the characteristics by transforming the values of the characteristics so that each characteristic has a value in a pre-determined range, e.g., zero to one, inclusive. Depending on the characteristic, the system can transform the value of the characteristic in any of a variety of ways. For example, the system can use the value as an input to a piecewise function that outputs one of two or more pre-determined values within the pre-determined range. As another example, the system can use the value as an input to a sigmoid function that outputs a value within the pre-determined range. As another example, the system can use the value as an input to a power function that outputs a value within the pre-determined range.

Once the values have been transformed, the system aggregates the transformed values to compute the template score, e.g., by computing the sum or the product of the transformed values. The system can optionally adjust the template scores based at least in part on whether the template is the best template on the linking resource, i.e., whether the template has the highest template score of any template on the linking resource. That is, the system can adjust the template scores so that a template that is the best template on the linking resource is assigned a larger template score than an otherwise equivalent template.

The system generates a linking score for the group of linking resources from which the descriptive text is generated (step 704). The system can generate the linking score based on any of a variety of characteristics of the group of linking resources.

For example, the linking score can be based in part on how frequently the group of resources receives selections, i.e., how frequently users select search results identifying resources in the group of linking resources. That is, the system can compute the linking scores so that a group of linking resources that has received selections more frequently is assigned a larger linking score than an otherwise equivalent group of linking resources that has received selections relatively less frequently.

As another example, the linking score can be based in part on whether the resources in the group of linking resources link to target resources that are hosted on multiple web sites. That is, the system can compute the linking scores so that a group of linking resources that links to a larger number of web sites is assigned a larger linking score than an otherwise equivalent group of linking resources that links to a smaller number of web sites.

The system can compute the linking score from the characteristics by transforming the values of the characteristics so that each characteristic has a value in a pre-determined range, e.g., zero to one, inclusive. Depending on the characteristic, the system can transform the value of the characteristic in any of a variety of ways. For example, the system can use the value as an input to a piecewise function that outputs one of two or more pre-determined values within the pre-determined range. As another example, the system can use the value as an input to a sigmoid function that outputs a value within the pre-determined range. As another example, the system can use the value as an input to a power function that outputs a value within the pre-determined range.

The system generates a target score for the target resource with which the descriptive text is associated (step 706). The system can generate the target score based on any of a variety of characteristics of the target resource. For example, the target score can be calculated based on whether terms in the piece of synthetic descriptive text match terms in the target resource. For example, the target score can be based at least in part on how many terms in the piece of synthetic descriptive text occur more than a threshold number of times in the resource. As another example, the target score can be based at least in part on a total number of occurrences of each term in the piece of synthetic descriptive text in the resource. As another example, if at least a threshold number or threshold proportion of terms in the piece of synthetic descriptive text occur in the resource less than a threshold number of times, the system may assign a pre-determined target score, e.g., zero, for the piece of synthetic descriptive text. The system computes a query-independent score for the piece of synthetic descriptive text (step 708) from the template score, linking score, and target score. For example, the query-independent score may be a weighted sum of the template score, the linking score, and the target score. As another example, the query-independent score may be a product of the template score, the linking score, the target score, and, optionally, a pre-determined constant value, e.g., one, five, or ten.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   identifying a group of linking resources, wherein each of the linking resources includes a link to a respective target resource;
   determining, from a search engine index, that at least some of the target resources are associated with seed queries;

generating one or more templates, wherein each template is derived from one or more triples, each triple includes a respective linking resource, a respective target resource linked to by the respective linking resource, and a respective seed query that is associated with the respective target resource, and the template identifies one or more locations of terms from the one or more seed queries in the linking resources in the one or more triples, and wherein generating the one or more templates comprises:

generating a plurality of candidate templates from locations of terms from the seed queries in the linking resources that link to the target resources associated with the seed queries; and selecting one or more of the candidate templates as templates; and generating synthetic descriptive text for one or more of the target resources, comprising, for each of the one or more templates:

identifying one or more other linking resources, other than the one more respective linking resources in the triples from which the template was derived, that each include a match for all of the one or more locations identified in the template, and for each of the one or more other linking resources:

applying the template to the other linking resource to extract text from one or more locations in the other linking resource that match the one or more locations identified in the template, designating the text extracted from the one or more locations in the other linking resource by applying the template as synthetic descriptive text for a target resource linked to by the other linking resource, and associating the synthetic descriptive text for the target resource linked to by the other linking resource with the target resource in the search engine index.

2. The method of claim 1, wherein generating the plurality of candidate templates comprises:

determining, that a term from a first seed query associated with a first target resource linked to by a first linking resource appears in a first structure of the first linking resource; and generating a first candidate template that specifies a generative rule for generating synthetic descriptive text for other target resources from structures in other linking resources that are similar to the first structure and that specifies a location in the other linking resources where a link to the other target resources must appear.

3. The method of claim 2, wherein the first candidate template includes at least one of a literal or a wildcard, the literal including a literal phrase and the wildcard including a type that specifies a category of terms and at least one constraint, wherein each constraint indicates a context within which the terms appear in the first linking resource.

4. The method of claim 3, wherein the context within which the terms appear in the first linking resource is based at least in part on a count of a number of times the terms appear in the first linking resource.

5. The method of claim 2, wherein the first structure includes an embedded coding fragment of the first linking resource.

6. The method of claim 5, wherein the embedding coding fragment is a hypertext markup language (HTML) tag pair that encloses the term from the first seed query in the first linking resource.

7. The method of claim 5, further comprising:
selecting the first candidate template as a first template, wherein applying the first template to other linking resources comprises:

identifying other embedded coding fragments of the other linking resources that match the embedded coding fragment identified in the first candidate template; and designating content in the other embedded coding fragments as synthetic descriptive text in accordance with the generative rule.

8. A system comprising one or more computers and one or more storage devices, the one or more storage devices storing instructions that, when executed by the one or more computers, cause the one or more computers to perform operations comprising:

identifying a group of linking resources, wherein each of the linking resources includes a link to a respective target resource;

determining, from a search engine index, that at least some of the target resources are associated with seed queries;

generating one or more templates, wherein each template is derived from one or more triples, each triple includes a respective linking resource, a respective target resource linked to by the respective linking resource, and a respective seed query that is associated with the respective target resource, and the template identifies one or more locations of terms from the one or more seed queries in the linking resources in the one or more triples, and wherein generating the one or more templates comprises:

generating a plurality of candidate templates from locations of terms from the seed queries in the linking resources that link to the target resources associated with the seed queries; and selecting one or more of the candidate templates as templates; and generating synthetic descriptive text for one or more of the target resources, comprising, for each of the one or more templates:

identifying one or more other linking resources, other than the one more respective linking resources in the triples from which the template was derived, that each include a match for all of the one or more locations identified in the template, and for each of the one or more other linking resources:

applying the template to the other linking resource to extract text from one or more locations in the other linking resource that match the one or more locations identified in the template, designating the text extracted from the one or more locations in the other linking resource by applying the template as synthetic descriptive text for a target resource linked to by the other linking resource, and associating the synthetic descriptive text for the target resource linked to by the other linking resource with the target resource in the search engine index.

9. The system of claim 8, wherein generating the plurality of candidate templates comprises:

determining, that a term from a first seed query associated with a first target resource linked to by a first linking resource appears in a first structure of the first linking resource; and generating a first candidate template that specifies a generative rule for generating synthetic descriptive text for other target resources from structures in other linking resources that are similar to the first structure and that specifies a location in the other linking resources where a link to the other target resources must appear.

10. The system of claim 9, wherein the first candidate template includes at least one of a literal or a wildcard, the literal including a literal phrase and the wildcard including a type that specifies a category of terms and at least one constraint, wherein each constraint indicates a context within which the terms appear in the first linking resource.

11. The system of claim 10, wherein the context within which the terms appear in the first linking resource is based at least in part on a count of a number of times the terms appear in the first linking resource.

12. The system of claim 10, wherein the first structure includes an embedded coding fragment of the first linking resource.

13. The system of claim 12, wherein the embedding coding fragment is a hypertext markup language (HTML) tag pair that encloses the term from the first seed query in the first linking resource.

14. The system of claim 13, the operations further comprising:
selecting the first candidate template as a first template, wherein applying the first template to other linking resources comprises:
identifying other embedded coding fragments of the other linking resources that match the embedded coding fragment identified in the first candidate template; and
designating content in the other embedded coding fragments as synthetic descriptive text in accordance with the generative rule.

15. A non-transitory computer storage medium encoded with a computer program, the program comprising instructions that when executed by one or more computers cause the one or more computers to perform operations comprising:
identifying a group of linking resources, wherein each of the linking resources includes a link to a respective target resource;
determining, from a search engine index, that at least some of the target resources are associated with seed queries;
generating one or more templates, wherein each template is derived from one or more triples, each triple includes a respective linking resource, a respective target resource linked to by the respective linking resource, and a respective seed query that is associated with the respective target resource, and the template identifies one or more locations of terms from the one or more seed queries in the linking resources in the one or more triples, and wherein generating the one or more templates comprises:
generating a plurality of candidate templates from locations of terms from the seed queries in the linking resources that link to the target resources associated with the seed queries; and
selecting one or more of the candidate templates as templates; and
generating synthetic descriptive text for one or more of the target resources, comprising, for each of the one or more templates:
identifying one or more other linking resources, other than the one more respective linking resources in the triples from which the template was derived, that each include a match for all of the one or more locations identified in the template, and
for each of the one or more other linking resources:
applying the template to the other linking resource to extract text from one or more locations in the other linking resource that match the one or more locations identified in the template,
designating the text extracted from the one or more locations in the other linking resource by applying the template as synthetic descriptive text for a target resource linked to by the other linking resource, and
associating the synthetic descriptive text for the target resource linked to by the other linking resource with the target resource in the search engine index.

16. The computer storage medium of claim 15, wherein generating the plurality of candidate templates comprises:
determining, that a term from a first seed query associated with a first target resource linked to by a first linking resource appears in a first structure of the first linking resource; and
generating a first candidate template that specifies a generative rule for generating synthetic descriptive text for other target resources from structures in other linking resources that are similar to the first structure and that specifies a location in the other linking resources where a link to the other target resources must appear.

17. The computer storage medium of claim 16, wherein the first candidate template includes at least one of a literal or a wildcard, the literal including a literal phrase and the wildcard including a type that specifies a category of terms and at least one constraint, wherein each constraint indicates a context within which the terms appear in the first linking resource.

18. The computer storage medium of claim 17, wherein the context within which the terms appear in the first linking resource is based at least in part on a count of a number of times the terms appear in the first linking resource.

19. The computer storage medium of claim 17, wherein the first structure includes an embedded coding fragment of the first linking resource.

20. The computer storage medium of claim 19, wherein the embedding coding fragment is a hypertext markup language (HTML) tag pair that encloses the term from the first seed query in the first linking resource.

21. The computer storage medium of claim 20, the operations further comprising:
selecting the first candidate template as a first template, wherein applying the first template to other linking resources comprises:
identifying other embedded coding fragments of the other linking resources that match the embedded coding fragment identified in the first candidate template; and
designating content in the other embedded coding fragments as synthetic descriptive text in accordance with the generative rule.

* * * * *